United States Patent [19]

Kondo et al.

[11] Patent Number: 4,917,299
[45] Date of Patent: Apr. 17, 1990

[54] METHOD FOR SPRAYING ANTI-TERMITE AGENT AND THE APPARATUS THEREFOR

[75] Inventors: Osamu Kondo, Otokuni; Makoto Sakurai, Muko; Yoshihiro Toyonaga, Takatsuki; Kazuhito Hokada, Hirakata, all of Japan

[73] Assignee: Shinto Paint Co., Ltd., Hyogo-Ken, Japan

[21] Appl. No.: 167,154

[22] Filed: Mar. 16, 1988

[30] Foreign Application Priority Data

Mar. 19, 1987 [JP] Japan .................................. 62-66862

[51] Int. Cl.⁴ .............................................. B05B 17/04
[52] U.S. Cl. ...................................... 239/8; 239/428.5
[58] Field of Search .................. 239/8, 428.5; 43/132.1

[56] References Cited

U.S. PATENT DOCUMENTS

| | | | |
|---|---|---|---|
| 2,603,469 | 7/1952 | Bedford et al. | 239/428.5 |
| 2,761,516 | 9/1956 | Vassilkovsky | 239/428.5 |
| 3,424,250 | 1/1969 | Thomae | 239/428.5 |
| 3,563,461 | 2/1971 | Cole, Jr. | 239/8 |
| 3,618,856 | 11/1971 | Sachnik | 239/8 |
| 3,793,762 | 2/1974 | Stains | 239/8 |
| 3,836,076 | 9/1974 | Conrad et al. | 239/8 |
| 4,330,086 | 5/1982 | Nysted | 239/8 |

FOREIGN PATENT DOCUMENTS

2309801 10/1973 Fed. Rep. of Germany ... 239/428.5

*Primary Examiner*—Andres Kashnikow
*Assistant Examiner*—Michael J. Forman
*Attorney, Agent, or Firm*—Wenderoth, Lind & Ponack

[57] ABSTRACT

A spray nozzle for spraying anti-termite agent has a base portion including a supply portion having a generally cylindrical shape and being formed with one or a plurality of jetting ports at one side end in the axial direction of the supply portion, and a horn portion having one end portion attached to the jetting ports side of the base portion. The horn portion has a plurality of air suction holes peripherally at an adjacent position where the jetting ports are situated about the axial direction thereof, and air is sucked by utilizing the Venturi effect of jet streams of the agent in order to spray the agent in bubble form.

2 Claims, 7 Drawing Sheets

METHOD FOR SPRAYING ANTI-TERMITE AGENT AND THE APPARATUS THEREFOR

BACKGROUND OF THE INVENTION

1. Field of the Invention

This invention relates to a method for spraying an anti-termite agent and the apparatus therefor for the termite-proofing of a house.

2. Description of the Prior Art

For termite-proofing underfloor portions, etc. of a house, an anti-termite agent is usually sprayed by means of a spraying apparatus, for example, an engine- or motor-powered spraying machine in which the agent is transported in liquid form under pressure and to which are connected a hose and a spray gun through which the liquid agent is sprayed. The front end portion (nozzle) of the spray gun used for this purpose is an important element which determines the condition of agent spray. Spray guns are commercially available in various forms according to various uses.

Hitherto, for termite-proofing purposes, a pistol type spray gun (hereinafter referred to as spray gun) 1 has been most commonly used, which is typically has the structure shown in FIG. 1. This spray gun 1 is described with reference to FIG. 1. A handle portion 2 of the spray gun 1 has an agent supply pipeline 3 provided therein which communicates with a conduit 5 provided in a barrel portion 4 formed integrally with the handle portion 2. The conduit 5 communicates with a valve chamber 7 in a mechanism portion 6 fixed to the barrel portion 4.

An external thread 9 is cut on a portion adjacent the front end of a tubular body 8 which defines the valve chamber 7. At the front end of the tubular body 8 there are disposed a valve member 11 having a valve seat 10, and a tapered nozzle 12 having the shape of a generally truncated cone, which are fixed in the foregoing order to the tubular body 8 by means of a cap 13 screwed into threaded engagement with the external thread 9.

The tubular body 8 is formed at its base end side with an insertion hole 15 through which a valve rod 14 is inserted. At the interior side of the insertion hole 15, the valve rod 14 has a locking protrusion 16 formed thereon and the tubular structure 8 has a recessed portion 17 which is diametrically smaller than the inner diameter of the tubular body 8 and larger than the insertion hole 15.

At its front end the valve rod 14 has a tapered valve body 18 formed thereon which is engageable with the valve seat 10 of the valve member 11. The valve rod 14, at its base end side, is adapted to be back and forth movably fitted in a guide hole 19 bored in the handle portion 2 so that the valve rod 14 can be guided free of jolting while being movably supported at a point adjacent the insertion hole 15. A control lever 20 is pivotally supported at its one end on a pivot shaft 21 in the barrel portion 4 so that it is angularly displaceable about the pivot shaft 21. Such a control lever 20 is angularly displaceably connected with the valve rod 14, both the lever 20 and the rod 14 being biased by a coil spring 22 in the direction of valve closing (i.e., in the leftward direction in FIG. 1).

A chemical agent transported under pressure through the agent supply pipeline 3 is fed into the valve chamber 7 via the conduit 5. In this case, unless the control lever 20 is manipulated for movement in the direction of arrow A1, the valve body 18 remains in contact with the valve seat 10 by the spring force exerted by the coil spring 22, the chemical agent being thus prevented from jetting from the nozzle 12.

To spray the agent, the control lever 20 is manipulated against the biasing force of the coil spring 22 and in the direction of arrow A1, whereby the valve body 18 is moved away from the valve seat 10 so that the agent is allowed to jet out from the nozzle 12. The nozzle 12 used in the spray gun is simply of such a construction that the area of its front end is reduced so as to allow vigorous jetting of the agent.

The conventional spraying apparatus employs a nozzle 12 having such a small jet orifice 23 for simply spraying the agent in a rod-like or mist-like pattern; therefore it has a drawback in that during a spraying operation, there may be considerably amount of splash back of liquid from the objects being treated (such as house walls and pillars) and, if the liquid is sprayed in a mist-like pattern, there is considerable fly-off of fine misty particles of the liquid which will contaminate the operator. In order to ensure a sufficient discharge and a sufficient range of the spray, there is required a pressure of 25-30 $kg/cm^2$ (pressure at the operator side); however, operation under such pressure will involve a greater possibility of fly-off of liquid mist, which naturally means a greater possibility of the operator being contaminated. If the pressure is reduced to 5-10 $kg/cm^2$ in order to reduce the possibility of such fly-off, there is a reduction in the rate of liquid discharge, though such fly-off can be reduced. This naturally means longer operation item, and after all it is not helpful for the purpose of the operator's safety.

SUMMARY OF THE INVENTION

In order to solve the foregoing problems, this invention has as its object the provision of an improved method for spraying an anti-termite agent and the apparatus therefor.

Another object of the invention is to provide a method for spraying an anti-termite agent and the apparatus therefor which can effectively solve the foregoing problems and remarkably reduce the operation time required, and which assures protection of the operator from contamination with the agent.

In order to accomplish these objects, the present inventor conducted extensive studies on ways and means for the termite-proofing of underfloor portions, etc. of wooden structures, and in the course of these studies, he discovered that by introducing air into particles of the agent to be sprayed, it was possible to reduce the amount of agent fly-off and yield a sufficient discharge under low pressure, thus carrying out the spraying operation safely and efficiently. And, it was also possible to spray the agent in the form of bubbles, thus obtaining an improved spraying effect, such as an improved effect of agent deposition on the objects being treated. The present invention is based on this discovery.

A method for spraying an anti-termite agent according to the invention comprises sucking air by utilizing the Venturi effect of jet-streams of agent in order to spray the agent in bubble form.

In a preferred embodiment, the anti-termite agent to be sprayed is selected by from one of
  insecticide,
  dilute liquid of the insecticide with foaming agent added thereto, and dilute liquid of the dilute liquid of the insecticide and foam stabilizer added thereto.

In another preferred embodiment, the anti-termite agent realizing the Venturi effect is sprayed through a single or a plurality of jetting ports.

In a further preferred embodiment, the anti-termite agent is guided by using a guide member when the anti-termite agent is sprayed through the plural jetting ports.

In a still further preferred embodiment, the anti-termite agent is sprayed at a pressure of about 5 kg/cm$^2$ or less.

An apparatus for spraying anti-termite agent according to the invention is provided with a spray nozzle comprising a base portion including a supply portion housing a generally cylindrical shape and being formed with one or a plurality of jetting ports onto one side end in the axial direction of the supply portion, and a horn portion having one end portion attached to the jetting ports side of the base portion and being formed with a plurality of air suction holes peripherally at an adjacent position where the jetting ports are situated about the axial direction thereof.

In a preferred embodiment, the one side end of the supply of the spray nozzle is provided with a guide member extending in the axial direction, the guide member having a plurality of jetting ports therearound.

In another preferred embodiment, the jetting ports are formed on the central portion in the radial direction of the one side end of the supply portion of the spray nozzle.

In a further preferred embodiment, the horn portion of the spray nozzle is provided with a cover member surrounding the air suction holes.

In a still further preferred embodiment, an external thread is formed on the base portion of the spray nozzle, and an internal thread is formed on a connecting portion of the horn portion with the base portion, the spray nozzle and the horn portion being engaged with each other.

In a preferred embodiment, the horn portion is formed in such a way that the diameter of the horn portion decreases from the base end portion to the front end portion thereof.

In a further preferred embodiment, an open/close cock by which anti-termite agent is transferred forcefully is connected to the spray nozzle.

In a still further preferred embodiment, a pistol type spray gun by which anti-termite agent is transferred forcefully is connected to the spray nozzle.

In another preferred embodiment, a handle type spray gun by which anti-termite agent is transferred forcefully is connected to the spray nozzle.

According to the invention, when an anti-termite agent is sprayed, air is sucked by the Venturi effect of jet streams of the agent, whereby the agent is sprayed in the form of bubbles. Thus, splashing of droplets of the agent from house walls or pillars on which the agent is sprayed, and fly-off of fine particles due to spraying can be inhibited, so that the operator can be prevented from being contaminated with the agent. Further, even if there is some increase in the rate of agent discharge, such splashing and such fly-off are inhibited as mentioned above; therefore, the desired discharge rate can be attained, and thus considerable time savings can be achieved over the course of the spraying operation.

The invention assures a considerable reduction in the fly-off of particles of the agent during a termite-proofing operation, and therefore it is very effective for minimizing the possibility of the operator being exposed to the danger of contamination with the chemical agent. Furthermore, the method assures improved operating efficiency. Therefore, the method can be advantageously employed in termite-proofing operations.

BRIEF DESCRIPTION OF THE DRAWINGS

These and other objects, features and advantages of the invention will become more apparent upon a reading of the following detailed specification and drawings, in which.

DETAILED DESCRIPTION OF THE PREFERRED EMBODIMENTS

Referring now to the drawings, embodiments of the invention are described below.

Figure 2:
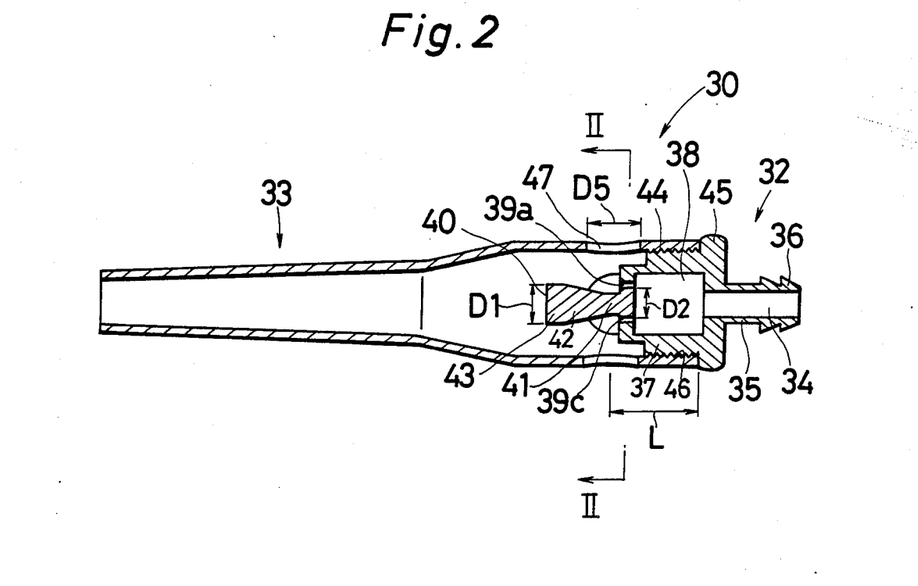
FIG. 2 is a sectional view showing a nozzle 30 according to one embodiment of the invention.
Figure 3:
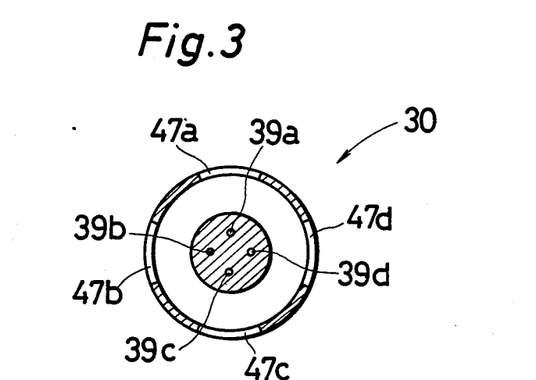
FIG. 3 is a cross section taken along line II—II in FIG. 2.
Figure 4:
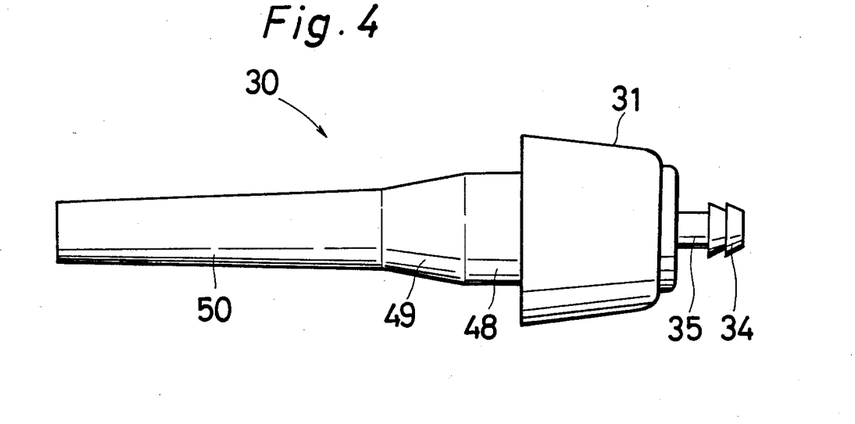
FIG. 4 is a front view showing the nozzle 30 fitted with a cover member 31.
Figure 5:
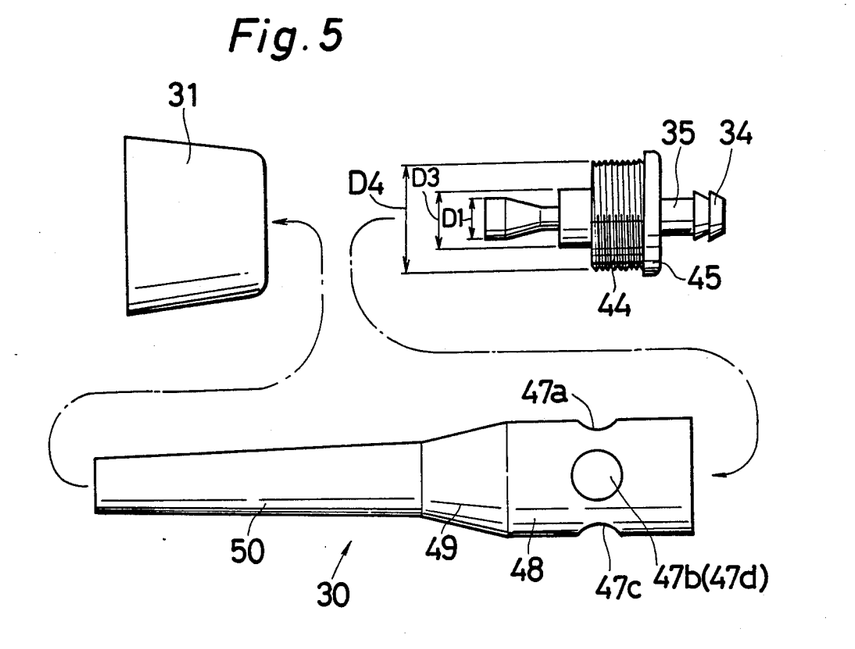
FIG. 5 is an exploded front of the nozzle 30 in FIG. 4.

FIG. 2 is a sectional view of a spray nozzle (hereinafter referred to as nozzle) 30 in accordance with one embodiment of the invention; FIG. 3 is a cross section taken along cutting plane line II—II in FIG. 2; FIG. 4 is a front view of the nozzle 30 as it appears when it is fitted with a cover member 31 which will be described hereinafter; and FIG. 5 is an exploded front view of the nozzle 30 in FIG. 4. The nozzle 30 of the present embodiment will now be described with reference to FIGS. 2–5. The nozzle 30 essentially includes a base portion 32 and a horn portion 33. At one end side of the base portion 32 there is provided a connecting portion 35 which defines a supply port 34 through which a chemical agent, such as an anti-termite agent, is supplied under pressure. The connecting portion 35 is formed on the outer periphery thereof with a plurality having locking ridges 36.

The base portion 32 includes a supply portion 37 of a generally cylindrical shape which is formed integrally with the connecting portion 35. In the supply portion 37 there is defined a supply chamber 38 which communicates with the supply port 34, and at one end of the supply portion 37 which is opposite to the connecting portion 35 there are formed a plurality of jetting ports 39a, 39b, 39c, 39d (four jetting ports in the present embodiment collectively designated by reference numeral 39) about the axis of the supply portion 37 and in a peripherally spaced-apart relation. At the left end side of the supply portion 37 in FIG. 2 and at an inner side location relative to the jetting ports 39 there is provided a fluid guide member 40 extending in a direction opposite from the connecting portion 35. As viewed from the supply portion 37, the guide member 40 comprises a rod-shaped mounting portion 41, a guide portion 42 which is a truncated cone flared outwardly as it extends away from the supply portion 37, and a right circular cylinder portion 43 having a diameter D1, as arranged in that order and formed integrally with one another. Said diameter D1 is selected in such a way that the following equation is satisfied in relation to distance D2 on diagonal lines between the jetting ports 39:

$$D1 \geq D2 \tag{1}$$

An external thread 44 is cut on the outer periphery of the supply portion 37, and there is formed a flange 45 adjacent the boundary between the thread 37 and the connecting portion 35. At one end of the horn portion 33 there is cut an internal thread 46, which is in engagement with the external thread 44. A plurality of air suction holes 47a, 47b, 47c, 47d (four in the present embodiment; collectively designated by reference numeral 47), each having a diameter D5 with its center positioned at distance L from the base end (the right side end in FIG. 2) of the horn portion 33, are formed around the axis of the horn portion 33 and in a peripherally spaced apart relation. In continuation to the right circular cylinder portion 48 of the horn portion 33 on which these air suction holes 47 are formed, there are integrally formed a truncated cone portion 49 which is tapered as it extends toward the front end side, and a tapered portion 50 having a more gradual taper than the truncated cone portion 49.

The configurations, numbers, and sizes of these jetting ports 39 and air suction holes 47 are suitably selected in consideration of the discharge rate, range of spray, and safety of the nozzle 30.

When carrying out the invention, a horn cover 31 may be provided around the air suction holes 47, as FIG. 5 shows, in order to prevent the agent from splashing through the air suction holes 47 and thus to ensure the safety of the spray operator. From the standpoint of operation convenience, it is preferred to provide a spray/stop mechanism at a position adjacent the nozzle 30. For example, an open/close cock 51 as shown in FIG. 6 may be provided.

Figure 6:
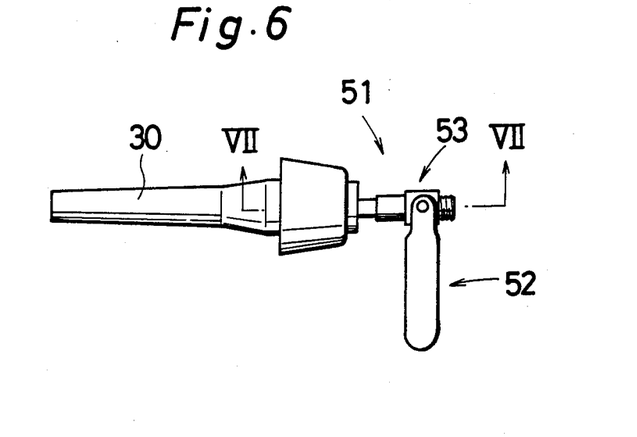
FIG. 6 is a front view of an open/close cock 51 to which the nozzle 30 is mounted.
Figure 7:
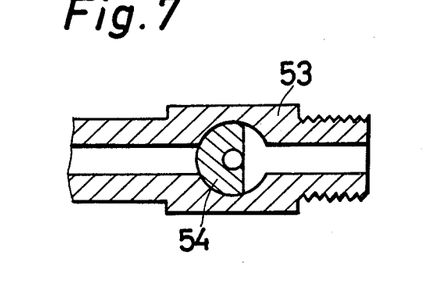
FIG. 7 is a sectional view of the open/close cock 51 in a shut-off condition.
Figure 8:
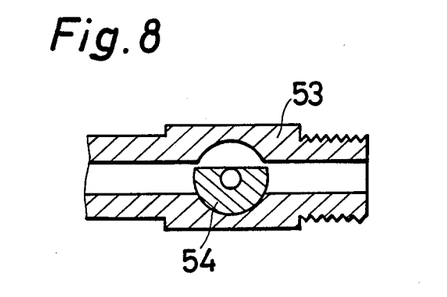
FIG. 8 is a sectional view of the open/close cock 51 in an open condition.

FIG. 6 is a front view showing the open/close cock 51 to which the nozzle 30 is mounted; FIG. 7 is a sectional view showing the cock 51 in a shut-off condition as taken along line VII—VII in FIG. 6; and FIG. 8 is a sectional view showing the cock 51 in an open condition as taken along line VIII—VIII in FIG. 6. The open/close cock 51 will be explained with reference to FIGS. 6–8. This open/close cock 51 has an obturating element 54 having a semi-cylindrical shape mounted on the base portion 53 of the control lever 52, it being so arranged that spray of the agent can be started or stopped by manipulating the control lever 52 to a position perpendicular to the axis of the nozzle 30 or to a position parallel thereto, as the case may be.

Any other type of spray cock which is generally used for termite proofing or insecticide spraying purposes may be employed in combination with the nozzle 30 of the invention, and through such combination it is possible to achieve improved control and improved operating efficiency of the nozzle 30. Such spray cocks are available in various types, such as pistol type, gun type, and handle type. Among other types are the long-distance type and the multi-head type. Any type of spray cock may be used if the nozzle 30 can be mounted to the front end thereof, and there is no particular limitation in the scope of spray cocks for use in this connection.

Figure 1:
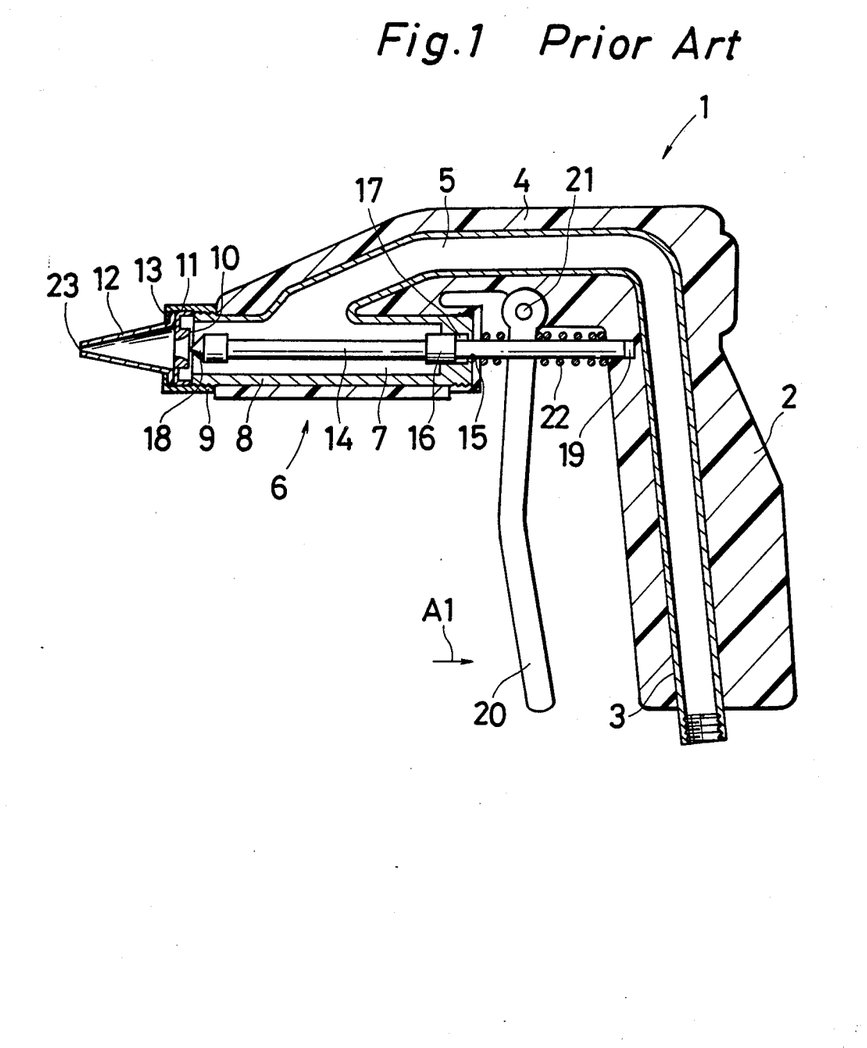
FIG. 1 is a sectional view showing a typical prior art spray gun 1.
Figure 9:
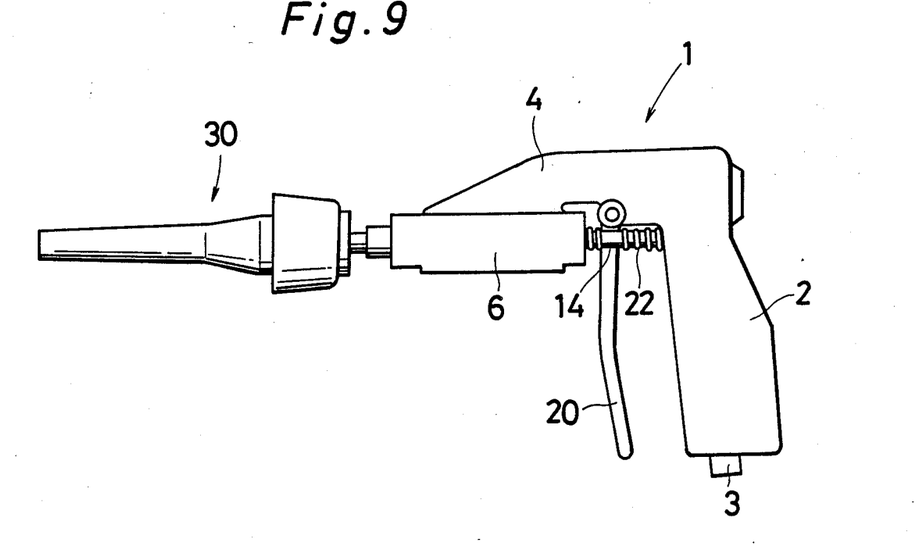
FIG. 9 is a front view showing a spray gun 1 to which the nozzle 30 is mounted.

In FIG. 9, for example, the nozzle 30 of the invention is shown in combination with the FIG. 1 conventional pistol type spray gun 1, from which the conventional nozzle 12 is removed. Such a pistol type spray gun 1 may have the same struction as described under the heading of the prior art; therefore, no further description is given thereabout.

Figure 10:
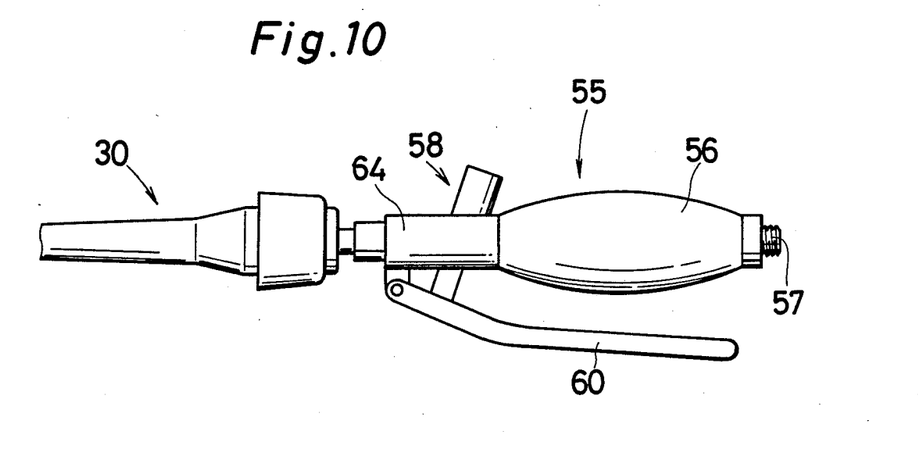
FIG. 10 is a front view showing a handle type spray gun 55 to which the nozzle 30 is mounted.
Figure 11:
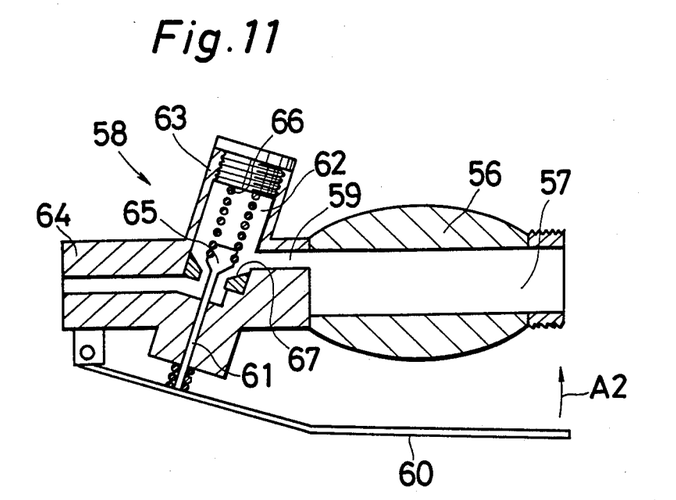
FIG. 11 is a sectional view of the FIG. 10 spray gun 55.

FIG. 10 is a front view showing a combination of the nozzle 30 of the invention with a handle type spray gun 55. FIG. 11 is a sectional view of the spray gun 55. The spray gun 55 will be explained with reference to FIGS. 10 and 11. In a handle portion 56 of the spray gun 55 there is formed a supply port 57 which communicates with a passage 59 in a mechanism portion 58. A control lever 60 is pin-connected to the mechanism portion 58 at a point adjacent its end opposite to the handle portion 56. The control lever 60 presses a valve rod 61 for displacing the rod in the longitudinal direction thereof. The valve rod 61, inserted into a spray gun body 64, has a valve body 65 formed at its inner side end.

The valve body 65 is urged toward the control lever 60 by a spring 66 provided in a tubular body 63 which defines a valve chamber 62. The valve body 65 contacts and moves away from a valve seat 67 formed in the spray gun body 64, whereby chemical agent spraying is started and stopped. This movement can be initiated by angularly displacing the control lever 60 in the direction of arrow A2, or in the opposite direction from arrow A2. Much manipulation of the control lever 60 can be performed by the operator gripping the handle portion 56 and the control lever 60 in in the direction of arrow A2 to effect spraying, and by releasing the control lever 60 to effect spray stopping.

The nozzle and cock used in the practice of the invention may be of any material conventionally used therefor, such as metal or plastic, there being no particular limitation on the material thereof.

As the anti-termite agent used in the practice of the invention, organic phosphorus insecticides, such as chlorpyrifos and phoxim; and pyrethroid insecticides, such as permithrin and the like may be employed. In addition, emulsions, aqueous emulsions, suspensions, and lubricants, which contain such preservative ingredients as 3-bromo- 2,3-iodo- 2-propenyl ethyl carbonate, versatic acid zinc, and the like, may be employed as required.

Further, it is possible to add a foaming agent to an emulsion. Foaming agents used for this purpose are of the type which are generally used as foaming agents for foamed termite proofing purposes, such as higher alcohol sulfonate, for example. There is no particular limitation on the amount of such foaming agent for use, but generally a sufficient foaming effect can be obtained by adding such an agent in the proportion of 0.1–5 parts by weight for every 100 parts by weight of dilute anti-termite agent liquid.

In addition, a slight amount of a auxiliary foaming agent (foam stabilizer), such as higher alcohol, may be added.

The invention will be described in further detail with reference to the following experimental examples. It is noted that parts represent parts by weight.

[EXPERIMENTAL EXAMPLE 1]

Spray tests were carried out by using a test box. The amount of chlorpyrifos (agent) in the air was measured, and the condition of the spray was observed.

(1) Preparation of nozzle 30 according to the invention

An open/close cock 51, as a spray on/off device, was mounted at the base of the nozzle 30 as shown in FIG. 1, and thus such a nozzle as shown in FIG. 5 was prepared.

(2) Preparation of test liquid

Tap water was added to 2.5 parts of a 40% chlorpyrifos emulsion ("Shintorentoreku" Emulsion L-400, trade name, made by Shinto Paint Co., Ltd.) to a total of 100 parts, whereby a dilute aqueous emulsion having a chlorpyrifos concentration of 1% (B) was prepared. One part of triethanolamine lauryl sulfate (made by Sanyo Kasei Kogyo Kabushiki Kaisha), as a foaming agent, was added to the dilute emulsion, whereby a dilute foaming agent liquid (C) was prepared. Also, 3 parts of triethanolamine polyoxyethylene lauryl ether sulfate (made by Sanyo Kasei Kogyo Kabushiki Kaisha), as a foaming agent, and 0.3 part of coconut oil fatty acid triethanolamine (made by Sanyo Kasei Kogyo Kabushiki Kaisha), as an auxiliary foaming agent, were added to the dilute emulsion, whereby a dilute foaming agent liquid (D) was prepared.

(3) Preparation of spray test box

Figure 12:
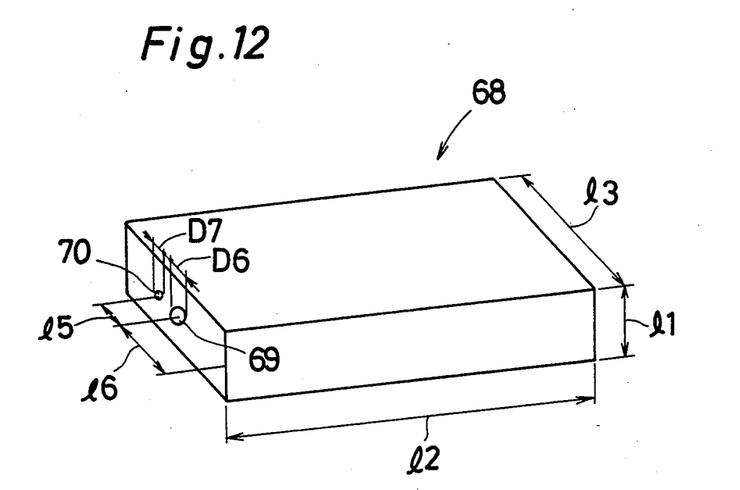
FIG. 12 is a perspective view showing an experimental box 68 used in conducting experiments to determine the effect of the present invention.

A rectangular box 68 having a length l1, a width l2, and a depth 3 (l1=45 cm, l2=100 cm, l3=400 cm) as shown in FIG. 12 was prepared. A jet port 69 having a diameter D6 (25 cm) was provided in the box at a distance l4 (40 cm) from the left end of the front side in FIG. 12. Similarly, an air collect port 70 having a diameter D7 (23 cm) was provided at a distance of 50 cm from same end.

(4) Spray test

Using the nozzle 30 according to the invention, with dilute emulsion (B), and dilute foaming liquids (C), (D), spraying was performed through the jet port 69 into the box 68 for 3 minutes. Drift condition of the spray liquids and the condition of foaming were observed, and air samples were collected through the air collect port 70.

For the purpose of comparison, the dilute emulsion (B) was sprayed by using the commercially available pistol type spray gun 1 shown in FIG. 12.

Tests were repeated twice.

(5) Absorption and analysis of air samples

Chlorpyrifos in air samples was collected by a chlorpyrifos absorption tube (special diatomaceous earth filled) mounted to the front end of a pump having an absorption capacity of 3l per minute, two times, namely, for 3 minutes during the spraying operation and for 10 minutes immediately after the spraying operation.

Extraction was carried out by using acetone, and an analysis was made by using an FPD type gas chromatograph. The amount of chlorpyrifos in the extracted liquid was covered into a chlorpyrifos concentration value (mg/m$^3$) in the air sample.

(6) Test results

The results obtained are shown in Tables 1 and 2.

TABLE 1

Spray Test Using Test Box

| Test No. | Nozzle | Test liquid | Air sampling | Spray pressure (at nozzle) | Total spray amount | Discharge |
|---|---|---|---|---|---|---|
| 1-1 | Nozzle of the invention (A) | Dilute emulsion (B) | During spray | 3.5 kg/cm$^2$ | 20 l | 6.6 l/min |
|  |  |  | After spray | — | — | — |
| 1-2 |  |  | During spray | 3.3 | 20 | 6.6 |
|  |  |  | After spray | — | — | — |
| 2-1 |  | Dilute foaming liquid (C) | During spray | 3 | 20 | 6.6 |
|  |  |  | After spray | — | — | — |
| 2-2 |  |  | During spray | 3 | 20 | 6.6 |
|  |  |  | After spray | — | — | — |
| 3-1 |  | Dilute foaming liquid (D) | During spray | 3 | 20 | 6.6 |
|  |  |  | After spray | — | — | — |
| 3-2 |  |  | During spray | 3 | 20 | 6.6 |
|  |  |  | After spray | — | — | — |
| 4-1 | (Comparative) postol type spray nozzle commercial | Dilute emulsion (B) | During spray | 10 | 13 | 4.4 |
|  |  |  | After spray | — | — | — |
| 4-2 |  |  | During spray | 10 | 13 | 4.4 |
|  |  |  | After spray | — | — | — |

TABLE 2

Spray Test Using Test Box

| Test No. | Nozzle | Test liquid | Air sampling | Reach of spray | Amount of air absorbed | Amt of chlorpyrifos in the air |
|---|---|---|---|---|---|---|
| 1-1 | Nozzle of the invention (A) | Dilute emulsion (B) | During spray | 2.5–3 m | 9 l | 0.117 mg/m$^3$ |
|  |  |  | After spray | — | 30 | 0.071 |
| 1-2 |  |  | During spray | 2.5–3 | 9 | 0.130 |
|  |  |  | After spray | — | 30 | 0.072 |
| 2-1 |  | Dilute foaming liquid (C) | During spray | 2.7–3.2 | 9 | 0.084 |
|  |  |  | After spray | — | 30 | 0.035 |

TABLE 2-continued

Spray Test Using Test Box

| Test No. | Nozzle | Test liquid | Air sampling | Reach of spray | Amount of air absorbed | Amt of chlorpyrifos in the air |
|---|---|---|---|---|---|---|
| 2-2 | | | During spray | 2.7–3.2 | 9 | 0.086 |
| | | | After spray | — | 30 | 0.029 |
| 3-1 | | Dilute foaming liquid (D) | During spray | 2.7–3.2 | 9 | 0.001 |
| | | | After spray | — | 30 | 0.019 |
| 3-2 | | | During spray | 2.7–3.2 | 9 | 0.002 |
| | | | After spray | — | 30 | 0.023 |
| 4-1 | (Comparative) pistol type spray nozzle, commercial | Dilute emulsion (B) | During spray | 2–3 | 9 | 1.588 |
| | | | After spray | — | 30 | 0.115 |
| 4-2 | | | During spray | 2–3 | 9 | 1.075 |
| | | | After spray | — | 30 | 0.102 |

In the emulsion spray tests using the conventional pistol type spray gun 1, fine particles of spray liquid from the front end of the nozzle 12 and those splashed spread over the entire box in mist form, whereas in the case of spraying by the nozzle 30 of the invention, practically no such fine particles were seen.

The results of the analyses showed that the amount of chlorpyrifos in the air during the spray tests using the nozzle of the invention was as low as about one tenth of that observed with the conventional method, in the case of emulsion spraying, and even lower in the case of foam spraying, say, as low as 1/15–1/890, as can be seen from Tables 1 and 2. Indeed, the range of values indicated, say, 0.001–0.086 mg/m$^3$, is far much lower that the allowable limit of 0.2 mg/m$^3$ of chlorpyrifos in working environments (TWA), it being thus proved that the method of the invention assures a good degree of safety in the spraying operation.

The concentration range in the air for 10 minutes right after spraying is about $\frac{2}{3}$–1/5. The rate of decrease is small, but from the view point of the existing practice of sequentially shifting to portions yet to be treated, such low level of concentrations will undoubtedly contribute to the safety of the operation.

Further, the method of the invention has an advantage over the conventional method with respect to spray pressure, discharge rate, and range of the spray. This fact shows that the method of the invention provides an improved operating efficiency.

[EXPERIMENTAL EXAMPLE 2]

Tests were made with respect to the amount of chlorpyrifos in the air during emulsion spraying and the achievable level of operating efficiency in the case of termite-proofing an ordinary house.

(1) Preparation of the nozzle of the invention

A nozzle as shown in FIG. 9 was prepared in which the FIG. 2 nozzle 30 of the invention was mounted to the commercially available pistol type spray gun 1 for emulsion spraying as shown in FIG. 1, from which the front end nozzle 12 was removed.

(2) Preparation of spray liquid

Tap water was added to 2.5 parts of 40% chlorpyrifos emulsion ("Shintorentoreku" Emulsion L-400 as earlier mentioned) to a total of 100 parts, whereby an emulsion spray liquid (B) (containing 1% of chlorpyrifos) was prepared. To this liquid were added 2 parts of triethanolamine lauryl sulfate and 0.2 part of coconut oil fatty acid triethanol amide, whereby a foam spray liquid (H) (containing 1% of chlorpyrifus) was prepared.

(3) Testing site, sampling of specimen air, and analysis procedure

| | |
|---|---|
| . Work | Emulsion spray over ground for termite prevention or control |
| . Site of test | Minami-ku, Fukuoka |
| . Date of test | 23–24 December, 1986 |

An above-mentioned chlorpyrifos absorption tube was attached to one side of the operator's gas mask, which tube was connected through a silicon tube to a suction pump (suction rate: 3 l/min) mounted on the back of the operator. Air was sampled during operation.

An analysis was made in same manner as in Experimental Example 1.

(4) Test results

Test results are shown in Tables 3 and 4.

TABLE 3

| Test No. | Nozzle | Test liquid | Area treated | Spray pressure (at nozzle) | Spray quantity | Absorption time |
|---|---|---|---|---|---|---|
| 5 | Nozzle of the invention (G) | Dilute emulsion (B) | "tsubo"* 24 | 3 kg/cm$^2$ | 158 l | 32 min. |
| 6 | | Dilute emulsion (H) | 21 | 140 | 26 | |
| 7 | | | 35 | 3 | 230 | 40 |

TABLE 3-continued

| Test No. | Nozzle | Test liquid | Area treated | Spray pressure (at nozzle) | Spray quantity | Absorption time |
|---|---|---|---|---|---|---|
| 8 | (Comparison) Pistol type nozzle, commercial | Dilute emulsion (B) | 22 | 10 | 160 | 35 |

*1 tsubo = 3.306 m$^2$

TABLE 4

| Test No. | Nozzle | Test liquid | Amount of air absorbed | Q'ty of chlorpyrifos in the air | Remarks |
|---|---|---|---|---|---|
| 5 | Nozzle of the invention | Dilute emulsion | 96 l | 0.107 mg/m$^3$ | Strip footing floor level abt 45 cm |
| 6 | (G) | Dilute foam liquid | 79 | 0.033 | Strip footing floor level abt 45 cm |
| 7 | | (H) | 121 | 0.029 | Strip footing short support floor level abt 60 cm |
| 8 | (Comparison) Pistol type nozzle, commercial | Dilute emulsion (B) | 105 | 0.804 | Strip footing floor level abt 50 cm |

In the emulsion spray tests using the conventional pistol type spray gun 1, fine particles of spray liquid from the front end of the nozzle and those splashed spread over the entire underfloor in mist form, whereas in the case of spraying by the nozzle 30, practically no such fine particles were seen.

The results of the chlorpyrifos measurements in the air during spray operation showed data similar to the tests results in Experimental Example 1, as can be seen from Tables 3 and 4.

The amount of chlorpyrifos in the air, as compared with that in the conventional method, was very small, say, as low as ⅛-1/25. Thus, the usefulness of the invention was proved.

In the case of foam spraying, a white layer having a thickness of a few centimeters was produced on the surface of the ground which was sprayed, which fact shows an advantage in that portions already treated could easily be distinguished from untreated portions. Further, the condition of the agent deposition on the foundation and footings was found very satisfactory.

Furthermore, with respect to operational characteristics, such as directional properties and the range of the spray, a favorable evaluation was obtained as compared with the conventional method.

As compared with the practice of emulsion spraying by using the conventional nozzle, the use of the nozzle 30 according to the invention provides the following advantages.

(a) Less fly-off of agent particles during the spray operation, which assures the safety of the operator.

For example, organic phosphorus agents are used today instead of chlordane in termite-proofing operations. Since phosphorus agents generally have a high acute toxicity, it is most important to minimize the possibility of the operator being contaminated with such agents during future anti-termite operations. According to the method of the invention, agent fly-off from the tip of the nozzle during a spraying operation is minimized, and the amount of agent particles splashing from the object being treated is considerably reduced. Therefore, the method of the invention is a good improvement over the practice of emulsion spraying using the conventional nozzle, from the standpoint of safety.

(b) High discharge rate and spraying operation at low pressure. Hence, improved operating efficiency.

In the practice of emulsion spraying by using the conventional nozzle, a pressure of 25-30 kg/cm$^2$ (at the nozzle) is applied in order to ensure sufficient discharge. This results in a considerable amount of agent fly-off, and if the pressure is reduced, there is a drop in discharge rate, which means poor operating efficiency. In contrast to this, the nozzle according to the invention is used under a low pressure in the order of 2-5 kg/cm$^2$; therefore, the possibility of agent fly-off is minimized and a discharge rate of as high as 6-8 l/min can be obtained. Thus, operation time can be considerably reduced. Furthermore, spraying under low pressure provides the advantage that a silent electric-motor powered spraying apparatus may be used instead of an engined-powered one which involves considerable noise.

(c) Improved directional performance during the spraying operation.

The horn portion of the nozzle has a cylindrical shape, which permits accurate delivery of spray streams on the object being treated.

The method of spraying the agent as a foam by using the nozzle of the invention provides the following advantages in addition to the above indicated three advantages in the case of emulsion spraying.

(d) Improved deposition and penetration relative to the object being treated.

Foams deposit well on the surface being treated, and they create less splash from such a surface. Therefore, where wooden surfaces are treated, penetration of the agent into the interior of the wood is facilitated, and a higher effect of treatment can be obtained.

(e) No treatment irregularity.

In contrast to emulsion spraying, foam spraying permits treated portions to be readily distinguished from untreated portions. This eliminates treatment irregularity and permits accurate treatment. Accordingly, the operating efficiency is improved.

As stated above, spraying operations using the nozzle of the invention provide various advantages. Above all, the possible contamination of the operator due to agent fly-off during the spraying operation can be effectively prevented. Another important merit is that operation time can be shortened.

Figure 13:
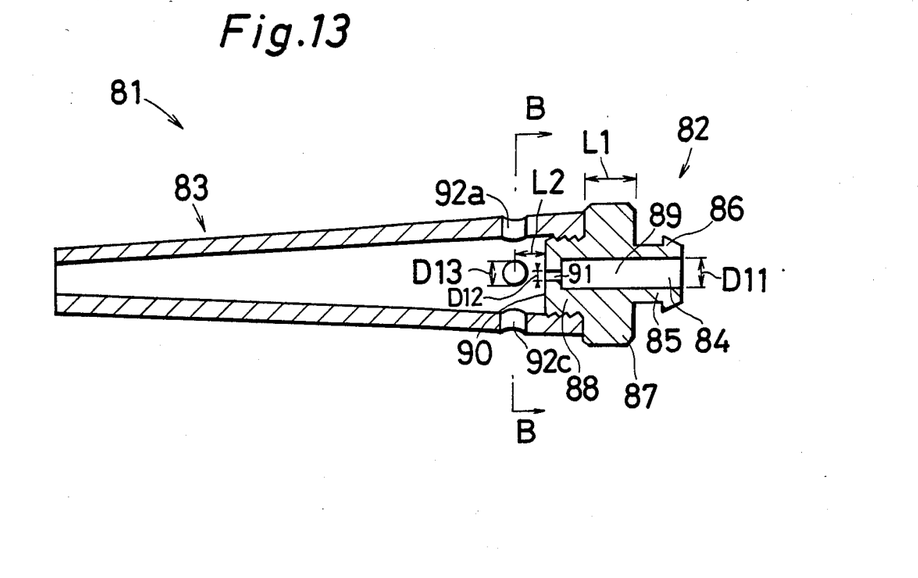
FIG. 13 is a sectional view showing a nozzle 81 according to another embodiment of the invention.
Figure 14:
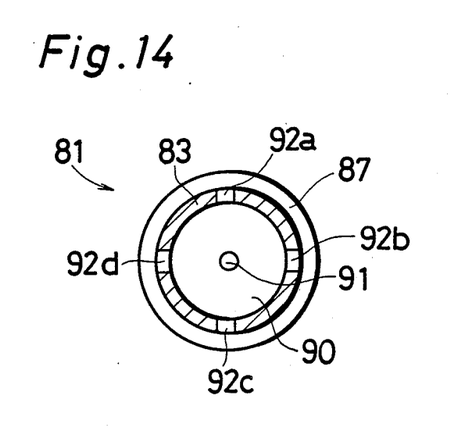
FIG. 14 is a cross section taken along line B—B in FIG. 13.

FIG. 13 is a sectional view showing a nozzle 81 according to another embodiment of the invention; and FIG. 14 is a cross section taken along line B—B in FIG. 13. The nozzle 81 will not be described with reference to FIGS. 13 and 14. The nozzle 81 in this embodiment is similar to the nozzle 30 of the earlier-described embodiment. These nozzles are both in accordance with the spirit of the present invention in which an anti-termite agent is sprayed as a foam by utilizing the so-called Venturi effect in hydrodynamics.

The nozzle 81 includes a base portion 82 and a horn portion 83. At one end side of the base portion 82 there is provided a connecting portion 85 which defines a supply port 84 having an inner diameter D11 through which an agent, for example, an anti-termite agent, is supplied under pressure and locking ridges 86 are formed on the outer periphery thereof. The base portion 82 comprises a flange portion 87 having an outer diameter larger than that of the connecting portion 85, and a mounting portion 88 having an outer diameter smaller than that of the flange portion 87 and an external thread cut thereon, said portions 87 and 88 being located in that order toward the horn portion 83 from the connecting portion 85, both being integrally formed.

The flange portion 87 has an axis-wise length L1. In the flange portion 87 and the mounting portion 88 there is defined a supply chamber 89 which communicates with the supply port 84 and has a diameter identical with that of the supply port 84. On one end wall 90 of the mounting portion 88 which is opposite to the flange portion 87 and at a radially central position there is formed a single jet hole 91 having an inner diameter D12 smaller than the inner diameter D11 of the supply chamber 89.

On the horn portion 83 and at positions spaced a distance L2 in the axial direction from said end wall 90 there are formed a plurality of air suction holes 92a, 92b, 92c, 92d (four in the present embodiment; where necessary, these holes may be collectively designated by reference numeral 92), each having an inner diameter D13, in a peripherally equally spaced relation.

In this embodiment, an agent, such as anti-termite agent, transported from the supply port 84 to the supply chamber 89 is jetted from the jet holes 91, and as a result of their being fast expanded, a negative pressure is generated, whereby air is sucked through the air suction holes 92 so that the agent is sprayed as a foam.

By employing such structure, it is also possible to obtain the same effects as described with respect to the nozzle 30 in connection with the earlier given experimental examples and elsewhere herein. This structure is also applicable to various examples of application already described with reference to FIGS. 4–11.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A method of spraying anti-termite agent, said method comprising:
   providing a nozzle having a longitudinal axis, jetting ports defined therein and radially spaced a predetermined distance from the longitudinal axis, suction holes defined therethrough open to the exterior of the nozzle and to the jetting ports, a fluid guide member extending in a downstream direction from a location disposed radially inward of the jetting ports and having a tapered guide portion that flares radially outwardly as taken along the longitudinal axis in said downstream direction, and a horn portion disposed in said downstream direction from the guide portion of the guide member and having an inner frustum-shaped guide surface that tapers uniformly as taken along the longitudinal axis in said downstream direction toward a discharge end of the nozzle;
   jetting anti-termite agent through the jetting ports to form jet streams which pass over the guide portion of the guide member and toward the horn portion;
   causing gas to be sucked into the nozzle through the suction holes by the jetting of the anti-termite agent through the jetting ports so as to flow with the jet streams;
   smoothly changing the direction in which the jet streams flow, when formed, by the passing of the jet streams over the guide portion of the guide member to create foam comprising the anti-termite agent and the gas sucked into the nozzle; and
   smoothly directing the foam radially inwardly as it is expelled from the nozzle by smoothly changing the direction in which the foam flows in the nozzle when formed, by the passing of the foam through the horn portion under the force of the jetting of the anti-termite agent through the jetting ports.

2. A method as claimed in claim 1,
   wherein the provision of the nozzle comprises providing a nozzle in which the air suction holes are defined therethrough at locations disposed radially outwardly of the jetting ports, and the causing of the air to be sucked into the nozzle comprises causing the air to be sucked into the nozzle at said locations disposed radially of the jetting ports.

* * * * *